No. 629,789. Patented Aug. 1, 1899.
C. R. HONIBALL.
VALVE.
(Application filed Oct. 22, 1898.)
(No Model.) 3 Sheets—Sheet 1.
Fig. I
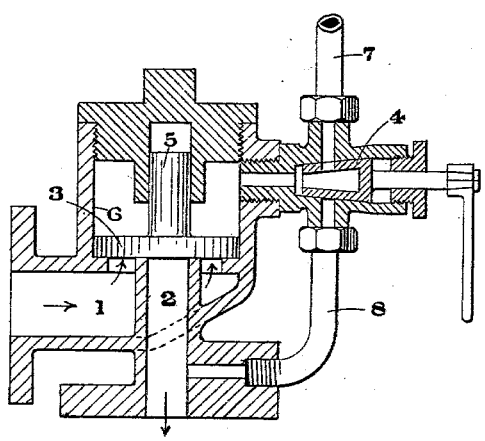
Fig. III
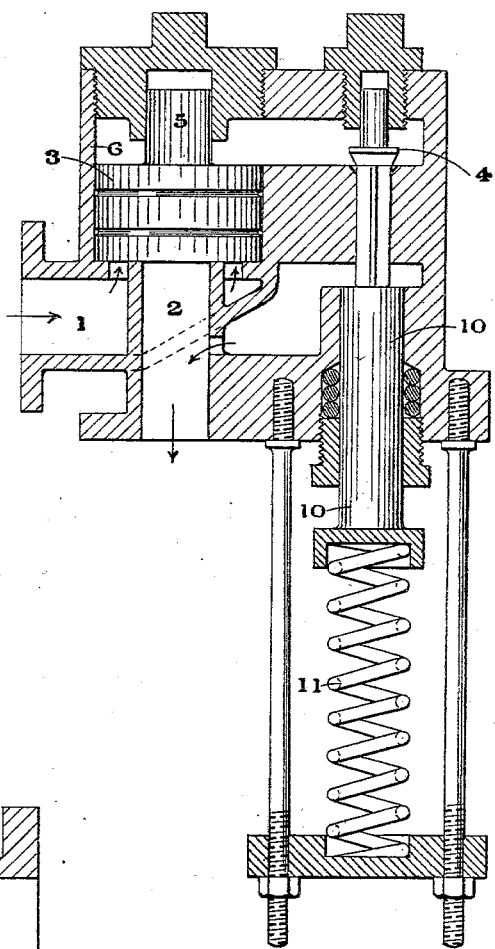
Fig. II
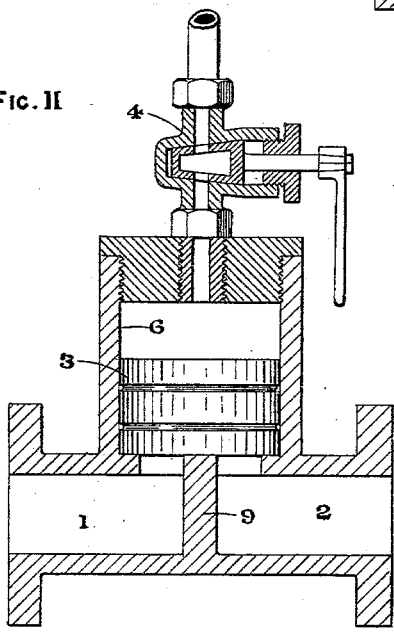
Attest
Wm. F. Hall.
F. L. Middleton.
Inventor
Charles R. Honiball
by Ellis Spear
Atty.

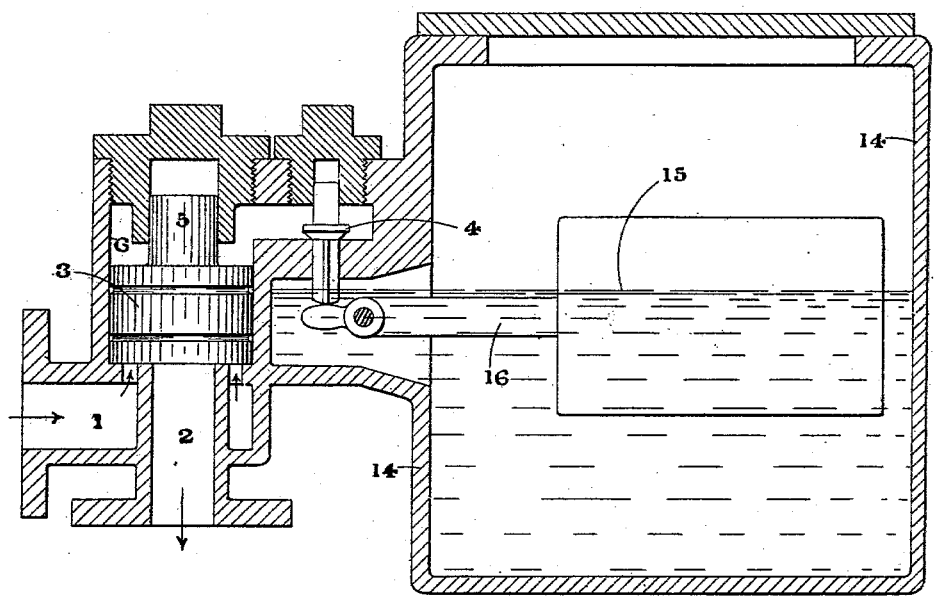
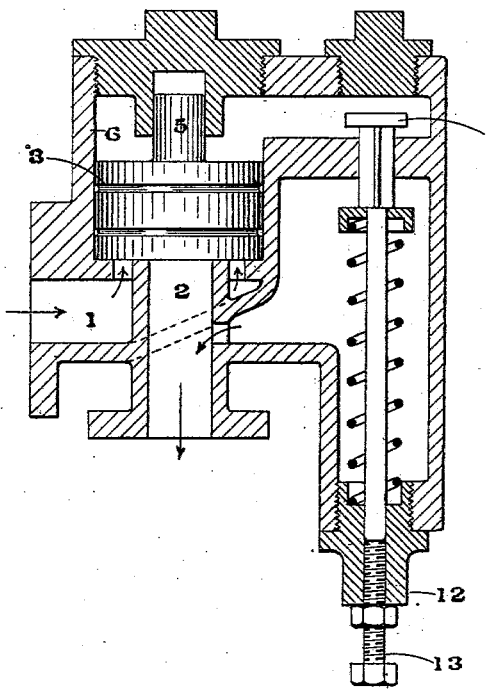

No. 629,789. Patented Aug. 1, 1899.
C. R. HONIBALL.
VALVE.
(Application filed Oct. 22, 1898.)
(No Model.) 3 Sheets—Sheet 3.
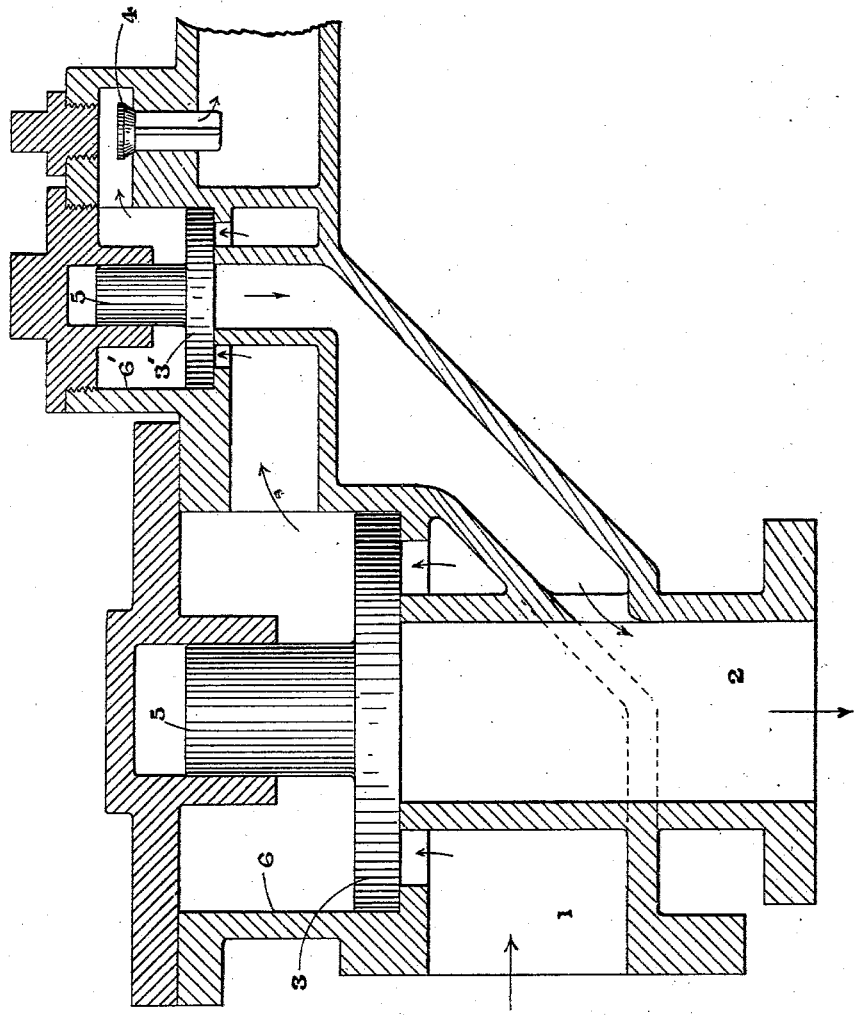
Attest
Wm. F. Hall,
F. L. Middleton
Inventor
Charles R. Honiball
by Eli Spear
Atty.
THE NORRIS PETERS CO., PHOTO-LITHO., WASHINGTON, D. C.

UNITED STATES PATENT OFFICE.

CHARLES ROLAND HONIBALL, OF LIVERPOOL, ENGLAND.

VALVE.

SPECIFICATION forming part of Letters Patent No. 629,789, dated August 1, 1899.

Application filed October 22, 1898. Serial No. 694,294. (No model.)

*To all whom it may concern:*

Be it known that I, CHARLES ROLAND HONIBALL, a subject of the Queen of Great Britain, residing in Liverpool, in the county of Lancaster, England, have invented certain new and useful Improvements in Valves, such as Stop-Valves, Reducing-Valves, Regulating-Valves, or the Like, of which the following is a specification.

This invention relates to a valve so constructed that the fluid whose passage the valve has to control is caused by varying the pressure thereof in an intermediate chamber to open or close the valve, as may be desired. The said variations in pressure in the intermediate chamber are controlled by a small supplemental cock or valve, which I shall term the "controlling" cock or valve, and my invention is susceptible of a number of different applications, depending upon different ways of using the controlling cock or valve.

I have illustrated my invention in the accompanying drawings, all of which are elevations in medial section.

Throughout the drawings similar parts are indicated by the same reference-figures.

Figures I and II show the valve in its simplest form, Fig. II only differing slightly from Fig. I in constructive detail. Figs. III, IV, and V show the application of the valve for different purposes, and they only differ constructionally in the method of controlling the controlling-valve. Fig. VI shows a construction suitable for a valve of large size.

Referring in the first instance to Fig. I, 1 is the inlet branch, 2 is the outlet branch, 3 is the valve proper, and 4 is the controlling-cock. The valve 3 is in the form of a flat disk and fits fluid-tight over the central outlet-port and the inlet-port, which is annular and concentric with the latter. It is guided by the stem 5 and fits freely like a piston in the bored portion 6 of the valve-box, which forms the intermediate chamber before referred to. The valve fits with sufficient freedom in the chamber 6 to allow a slight leakage into the space above the valve, and the pressure in this space is effective in operating the valve, as it is clear that the valve is urged upward by the inlet and outlet pressures acting upon their respective port areas and downward by the pressure in the space above the valve acting upon its whole upper surface and also by its own weight.

I have found that if the inlet and outlet ports are of equal area and the valve be off its seating, the controlling-cock 4 being closed, the pressure in the space 6 above the valve is very approximately the mean of the inlet and outlet pressures. Under these circumstances the valve will not remain open, and the function of the small-bore controlling-cock 4 is to provide an outlet for the steam in the chamber 6, which leaks past the valve, so as to reduce the pressure therein and allow the valve to remain open.

As already stated, the invention can be applied to a variety of purposes, depending upon the way in which the controlling-cock is controlled.

Fig. I represents a stop-valve intended to be controlled by hand, the valve 3 being opened or shut by simply opening or shutting the controlling-cock 4. The discharge from the controlling-cock may be delivered to the atmosphere by the pipe 7, or in order to avoid the loss of steam the cock may be turned to deliver as an alternative through the pipe 8, which may lead, say, to a condenser, hot-well, or as a by-pass into the outlet-passage 2, the latter arrangement being shown. As a stop-valve the arrangement possesses several advantages. In the first place very little effort will suffice to open or shut a large valve. In the second place the controlling-cock may be placed in a more convenient position than the main valve and at a considerable distance therefrom, being connected to it by a small pipe, and, further, the arrangement would act as a safety device in the event of the bursting of the pipe or vessel connected to the outlet 2, as the sudden fall of pressure therein would destroy the equilibrium and the valve would instantly close in virtue of the pressure above it, which can only fall slowly.

In Fig. II the construction is substantially similar to that already described, this form being used where it is desired to keep the inlet and outlet branches in line instead of at right angles. The inlet and outlet ports are arranged side by side, separated by the midfeather 9, instead of being concentric, as in Fig. I. Owing to its symmetrical form either branch may be used as the inlet.

Fig. III shows my invention arranged as a reducing-valve. The controlling-valve 4 delivers as a by-pass into the outlet 2, and it is controlled by the plunger 10, which passes through the stuffing-box shown and is adjustably loaded by the spring 11.

The action is as follows: Suppose that both the main valve and the controlling-valve are open and that steam is entering by the inlet branch 1 and issuing at reduced pressure by the outlet branch 2, the pressure above the valve being intermediate to these pressures. The controlling-valve is urged down by the pressure in the chamber 6, and it is urged up by the outlet-pressure below it and by the plunger 10, the plunger being itself urged up by the spring 11 and down by the outlet-pressure on its upper surface. If now the outlet-pressure should rise, the pressure above the plunger 10 will increase and lower it, and the controlling-valve will follow it, as its area is less than that of the plunger. Thus the pressure in the chamber 6 will rise and the valve 3 be forced down, so diminishing the outlet-pressure. The converse will hold if the outlet-pressure should fall, and thus the outlet-pressure is determined by the adjustment of the compression of the spring 11.

In the arrangement shown in Fig. IV the spring is applied directly to the controlling-valve and the plunger is dispensed with. The spindle of the controlling-valve is guided below in the cap 12 and abuts against the adjusting-screw 13, which is normally set so as to prevent the controlling-valve from actually closing. This arrangement is chiefly intended for use in connection with a steam-winch or the like under the following circumstances: It is found desirable in working a steam-winch to keep it continuously running, so that it runs light when not actually hoisting. The inlet 1 is connected to the boiler and the outlet 2 to the winch, and the action is as follows: When the winch is unloaded, steam of a very low pressure only is required to keep it running. Under these circumstances, the outlet-pressure (and therefore the pressure below the controlling-valve tending to open it) being low, the controlling-valve is forced down to the lowest position permitted by the screw 13, giving a very small outlet from the chamber 6, so that the pressure therein is relatively high, and the main valve 3 is forced down, so as to leave only a small thoroughfare for the outlet-steam. When the load is thrown on the winch, it suddenly slows somewhat, so that the pressure of steam in the outlet branch 2 rises, and as a result the controlling-valve is forced up, giving a freer outlet to the chamber 6 and allowing the main valve to rise and so give a larger passage to the outlet. When the load is again taken off the winch, the pressure of the outlet-steam will suddenly fall, the controlling-valve will fall against its stop, and the main valve will be forced down, so as to only pass a correspondingly-reduced supply of steam to the winch. In this way the device automatically adjusts the steam-supply to the requirements of the winch and dispenses with the necessity of adjusting the supply by hand.

The arrangement shown in Fig. V constitutes a feed-water regulating or check valve. 14 is, say, an evaporator or the like, and 15 is the normal water-level therein. The feed-water enters by the inlet branch 1, passes the main valve 3, and proceeds by the outlet branch 2 and a pipe (not shown) to the evaporator 14, and the controlling-valve 4 delivers to the same place, so that it forms, as before, a by-pass to the outlet branch. The controlling-valve is controlled by the float-lever 16, and it is clear from what has already been said that the supply of feed-water will be automatically controlled, so as to maintain a practically constant water-level.

In Fig. VI is shown what may be termed a "relay" arrangement, in which a large main valve 3 is controlled by a comparatively very small controlling-valve 4. As before, 1 is the inlet branch, 2 the outlet branch, and 6 the intermediate chamber. The discharge from the chamber 6 is controlled by the valve 3' of the same type as 3, and the discharge from its chamber 6' is in turn controlled by the controlling-valve 4. No special means are shown for controlling the valve 4, as it is to be understood that the arrangement shown in Fig. VI is merely a variation that may be adopted in the case of any of the previous arrangements when used on a large scale, and any of the previous methods of controlling the valve 4 may therefore be used.

Having now fully described my invention, what I claim, and desire to secure by Letters Patent, is—

1. In a valve, in combination: a box having an inlet and an outlet connected to separate ports, and a chamber above said ports; a valve working freely in the said chamber and adapted to cover both said ports, the space in said chamber above the valve being in communication with the inlet; a passage leading from said chamber; and a cock or valve adapted to control said passage; substantially as described and illustrated.

2. In a valve, in combination: a box having an inlet and an outlet connected to separate ports, and a chamber above the said ports; a valve working freely in the said chamber and adapted to cover both said ports, the space in said chamber above the valve being in communication with the inlet; a passage connecting the said chamber to the outlet; and a cock or valve adapted to control the said passage; substantially as described and illustrated.

3. In a valve, in combination: a box having an inlet and an outlet connected to separate ports, and a chamber above the said ports; a valve working freely in the said chamber and adapted to cover both said ports, the space in said chamber above the valve being in communication with the inlet; a passage connecting the said chamber to the outlet; and a valve which normally tends to close the said passage when there is a difference of pressure between the chamber and the outlet; substantially as described and illustrated.

4. In a valve, in combination: a box having an inlet and an outlet connected to separate ports, and a chamber above the said ports; a valve working freely in the chamber and adapted to cover both said ports; a passage connecting the said chamber to the outlet; and a valve controlling said passage and normally tending to close it when there is a difference of pressure between the chamber and the outlet, and controlled by means adapted to open the valve in opposition to such difference of pressure; substantially as described and illustrated.

5. In a valve, in combination: a box having an inlet and an outlet connected to separate ports, and a chamber above said ports; a valve working freely in said chamber and adapted to cover both said ports; a passage connecting said chamber to the outlet; and a valve controlling the said passage normally maintained open by an adjustable spiral spring, but which is closed when the difference of pressure on the chamber and outlet sides of the valve is sufficient to overcome the resistance of the spring; substantially as described and illustrated.

6. In a valve, in combination; a box having an inlet and an outlet connected to separate ports, and a chamber above said ports; a valve working freely in said chamber and adapted to cover both said ports; a passage connecting said chamber to the outlet; and a valve controlling the said passage and normally maintained open by a plunger actuated by a spiral spring and whose end is subjected to the pressure of the outlet which tends to compress the said spring; substantially as described and illustrated.

In testimony whereof I have hereunto set my hand in the presence of two subscribing witnesses.

CHARLES ROLAND HONIBALL.

Witnesses:
ROBERT A. SLOAN,
J. E. LLOYD BARNES.